United States Patent
Fleury et al.

(10) Patent No.: US 6,904,213 B2
(45) Date of Patent: Jun. 7, 2005

(54) STEP INDEX OPTICAL FIBER WITH DOPED CLADDING AND CORE, A PREFORM, AND A METHOD OF FABRICATING SUCH A FIBER

(75) Inventors: Ludovic Fleury, Bois d'Arcy (FR); Louis-Anne de Montmorillon, Paris (FR); Florent Beaumont, Conflans Ste Honorine (FR); Pierre Sillard, Le Chesnay (FR); Maxime Gorlier, Paris (FR); Pascale Nouchi, Maisons-Lafitte (FR); Jean-Florent Campion, Conflans St Honorine (FR); Christine Labatut, Conflans Ste Honorine (FR)

(73) Assignee: Alcatel, Paris (FR)

(*) Notice: Subject to any disclaimer, the term of this patent is extended or adjusted under 35 U.S.C. 154(b) by 184 days.

(21) Appl. No.: 10/136,297

(22) Filed: May 2, 2002

(65) Prior Publication Data

US 2002/0168162 A1 Nov. 14, 2002

(30) Foreign Application Priority Data

May 11, 2001 (FR) .............................. 01 06247

(51) Int. Cl.$^7$ ................................. G02B 6/02
(52) U.S. Cl. ...................... 385/123; 385/141; 385/142
(58) Field of Search .................. 385/123, 141, 385/142; 65/377, 412, 417, 419

(56) References Cited

U.S. PATENT DOCUMENTS

| | | | |
|---|---|---|---|
| 6,381,045 B1 * | 4/2002 | DiGiovanni et al. | 398/42 |
| 6,446,468 B1 * | 9/2002 | Fleming et al. | 65/412 |
| 6,580,854 B1 * | 6/2003 | Enomoto et al. | 385/37 |
| 6,580,860 B1 * | 6/2003 | Varner | 385/123 |
| 6,611,635 B1 * | 8/2003 | Yoshimura et al. | 385/14 |
| 6,650,813 B2 * | 11/2003 | Jeon et al. | 385/127 |
| 6,697,562 B1 * | 2/2004 | Lee et al. | 385/142 |
| 6,711,918 B1 * | 3/2004 | Kliner et al. | 65/390 |

FOREIGN PATENT DOCUMENTS

| EP | 1 000 909 A2 | 5/2000 |
|---|---|---|
| GB | 2 351 287 A | 12/2000 |

OTHER PUBLICATIONS

Patent Abstracts of Japan, vol. 13, No. 15, Jan. 13, 1989 & JP 63 222031 A (Sumitomo Electric Ind LTD), Sep. 14, 1988.
Patent Abstracts of Japan, vol. 12, No. 391, Oct. 18, 1988 & JP 139028 A (Sumitomo Electric Ind LTD), Jun. 10, 1988.
Patent Abstracts of Japan, vol. 12, No. 172, May 12, 1988 & JP 62 278141 A (Seiko Epson Corp) Dec. 3, 1987.
Patent Abstracts of Japan, vol. 11, No. 75, Mar. 6, 1987 & JP 61 232229 A (Sumitomo Electric Ind LTD), Oct. 16, 1986.
Patent Abstracts of Japan, vol. 12, No. 410, Oct. 28, 1988, & JP 63 147840 A (Fujikura LTD), Jun. 20, 1998.

* cited by examiner

*Primary Examiner*—John R. Lee
*Assistant Examiner*—Paul M. Gurzo
(74) *Attorney, Agent, or Firm*—Sughrue Mion, PLLC

(57) ABSTRACT

The invention provides a step index optical fiber which presents cladding having an index lower than the index of silica and a core with an index higher than the index of silica. The fiber is obtained by drawing a preform made by chemical vapor deposition using a deposition tube of index lower than the index of silica. Inner cladding of index substantially equal to the index of the deposition tube, and then a core of index higher than the index of the inner cladding are deposited in succession therein. The invention makes it possible to obtain a fiber having a large effective area, reduced attenuation, and suitable for being fabricated at low cost by chemical vapor deposition.

27 Claims, 1 Drawing Sheet

STEP INDEX OPTICAL FIBER WITH DOPED CLADDING AND CORE, A PREFORM, AND A METHOD OF FABRICATING SUCH A FIBER

The present invention relates to the field of optical fiber transmission, and more specifically to step index optical fibers used as line fibers in such transmission systems.

BACKGROUND OF THE INVENTION

The index profile of an optical fiber is generally described in terms of the appearance of the graph plotting the refractive index of the fiber as a function of radius. In conventional manner, the distance r to the center of the fiber is plotted along the abscissa axis and the difference between the refractive index and the refractive index of the fiber cladding is plotted up the ordinate axis. The index profile can thus be said to be "stepped", "trapezium-shaped", or "triangular" for graphs that are respectively step-, trapezium-, or triangle-shaped. Such curves are generally idealized profiles or reference profiles for the fiber, and fiber fabrication constraints can lead to a profile that departs perceptibly therefrom.

It is conventional for the line fiber in optical fiber transmission systems to be a step index fiber, also referred to as a single mode fiber (SMF). The Applicant company thus sells a single mode step index fiber under the reference ASMF 200 which presents a chromatic dispersion canceling wavelength $\lambda_0$ in the range 1300 nanometers (nm) to 1320 nm, and chromatic dispersion that is less than or equal to 3.5 picoseconds per nanometer kilometer (ps/(nm.km)) in the range 1285 nm to 1330 nm, and of 17 ps/(nm.km) at 1550 nm. At 1550 nm the chromatic dispersion slope is about 0.06 ps/(nm².km).

WO-A-00 36443 describes a step index optical fiber presenting a core of index greater than that of the cladding. The cladding is surrounded in a layer of carbon. The core presents a diameter lying in the range 9.5 micrometers ($\mu$m) to 12.0 $\mu$m. The relative difference in index between the core and the cladding lies in the range 0.3% to 0.5%. In that document, it is stated that the fiber can be fabricated using silica, by doping the core with germanium and using silica cladding; an alternative is to dope the cladding with fluorine, while using a silica core.

Both of those solutions suffer from drawbacks. Firstly, doping the core with germanium requires germanium to be used at high concentration—typically greater than 5% by weight—in order to achieve the required index difference relative to silica cladding. Such germanium concentrations increase attenuation in the fiber. Furthermore, fabricating a silica-core fiber with doped cladding, as suggested in that document, implies using a vapor axial deposition (VAD) technique during fabrication, or else using an outside vapor phase oxidation (OVPO) technique. WO-A-00 42458 describes a transmission fiber for long-distance transmission systems; the cladding is fluorine-doped and the core is chlorine-doped. The fiber is fabricated using a VAD technique.

To manufacture optical fibers, the modified chemical vapor deposition (MCVD) technique is also used. Layers of silica containing dopant for varying its index are deposited successively inside a deposition tube. Thereafter the tube is collapsed or contracted so as to constitute a first preform. This first preform is inserted in one or more sleeves which are collapsed or contracted in turn so as to press against the first preform. The resulting preform is drawn to form a fiber. Such techniques for fabricating a fiber are well known to the person skilled in the art.

Thus, EP-A-0 972 752 describes MCVD fabrication and it proposes depositing successive layers of cladding material and of core material inside a deposition tube. After contraction, the deposition tube is inserted in one or more sleeves; it is proposed that the inner sleeve should present doping to lower its index so as to constitute a buried-cladding fiber. The cladding deposited inside the deposition tube can be doped with fluorine, the core being doped with germanium. Providing the purity of the deposition tube is sufficient, it is possible to avoid depositing cladding. The deposition tube is a glass tube in which the concentration of OH⁻ ions is less than 0.05 parts per million (ppm) by weight. U.S. Pat. No. 4,566,754 or U.S. Pat. No. 5,692,087 thus propose a step index fiber manufactured by MCVD, in which fluorine-doped cladding and a germanium-doped core are deposited inside a silica deposition tube.

For the same type of preform, U.S. Pat. No. 5,942,296 suggests facilitating drawing down the preform by acting on the viscosity and the thermal conductivity of the silica deposition tube and of the sleeve(s) surrounding it. That solution makes it possible to avoid heating the core of the preform. It is specified in that document that the cost of MCVD fabrication decreases with decreasing thickness of the fluorine-doped cladding.

EP-A-0 899 243 also proposes a step index fiber presenting a germanium-doped core, inner cladding that is fluorine-doped, and outer cladding of non-doped silica. That application proposes drawing the fiber at a speed greater than 20 grams per minute (g/min).

EP-A-0 863 108 describes a method of fabricating a preform by plasma deposition of build-out material on the outside of the deposition tube.

OBJECTS AND SUMMARY OF THE INVENTION

The problem of the invention is that of fabricating step index fibers by MCVD. Compared with the solution proposed in those documents—a silica deposition tube, fluorine-doped cladding, and a germanium-doped core—the invention makes it possible to simplify the preform fabrication process and to reduce its duration and its cost. The invention also makes it possible to obtain a step index fiber having an effective area that is increased and attenuation that is decreased.

More precisely, the invention provides a method of fabricating a preform for drawing into an optical fiber, the method comprising:

using chemical vapor deposition to form inner cladding inside a deposition tube, the deposition tube presenting a refractive index lower than that of silica and the inner cladding presenting an index substantially equal to the index of the deposition tube, the relative difference between the index of the inner cladding and the index of the deposition tube having an absolute value smaller than 0.02%; and using chemical vapor deposition to form a core inside the cladding, the core presenting an index higher than the index of silica.

In an implementation, the difference between the index of the deposition tube and the index of silica is less than $-0.5 \times 10^{-3}$.

In another implementation, the difference between the index of the core and the index of the inner cladding lies in the range $4.3 \times 10^{-3}$ and $5 \times 10^{-3}$.

The method may further comprise:

collapsing the deposition tube with the inner cladding and the core; and depositing build-out material around the collapsed tube, the build-out material presenting an index substantially equal to the index of the deposition tube.

It is also possible to provide for:

collapsing the deposition tube with the inner cladding and the core; and collapsing a sleeve around the collapsed tube, the sleeve presenting an index substantially equal to the index of the deposition tube.

The invention also provides a preform for drawing into an optical fiber, the preform comprising:

a deposition tube presenting an index lower than the index of silica;

cladding inside the deposition tube presenting an index substantially equal to the index of the deposition tube, the relative difference between the index of the inner cladding and the index of the deposition tube having an absolute value of less than 0.02%; and a core inside the cladding presenting an index greater than the index of silica.

It is advantageous for the difference between the index of the deposition tube and the index of silica to be less than $-0.5 \times 10^{-3}$. Advantageously, the difference between the index of the core and the index of the inner cladding lies in the range $4.3 \times 10^{-3}$ and $5 \times 10^{-3}$.

Build-out material can be provided around the deposition tube, which material presents a refractive index substantially equal to the index of the deposition tube, or else a sleeve can be provided presenting an index that is substantially equal to the index of the deposition tube.

The invention also provides a method of fabricating an optical fiber, comprising drawing a fiber from such a preform.

Finally, the invention proposes an optical fiber comprising:

cladding having an index lower than the index of silica;

inner cladding extending inside said cladding and presenting an index substantially equal to the index of the cladding, the relative index difference between the index of the inner cladding and the index of the cladding having an absolute value smaller than 0.02%; and a core extending inside the inner cladding and presenting an index higher than the index of silica.

In an embodiment, the fiber presents:

a difference $\Delta n$ between the index of the core and the index of the inner cladding lying in the range $4.3 \times 10^{-3}$ and $5 \times 10^{-3}$;

a core radius $r_1$ lying in the range 4.8 μm to 5.7 μm; and a product $r_1 \times \sqrt{\Delta n}$ of the core radius multiplied by the square root of said difference lying in the range 0.336 μm to 0.378 μm.

The optical fiber may present cladding whose index difference relative to the refractive index of silica is less than $-0.5 \times 10^{-3}$ and a relative index difference between the index of the inner cladding and the index of the cladding smaller than 0.02% in absolute value.

The inner cladding is characterized by quasi-periodic variations of index lying in the range $0.3 \times 10^{-3}$ to $0.5 \times 10^{-3}$ in absolute value, presenting symmetry about the axis of the fiber with periodicity of about 0.6 μm to 1.4 μm. This inner cladding can be doped using $C_2F_6$, in which case the rate at which the index varies as given by the ratio between the peak-to-peak difference in the index and the half-period of the variations lies in the range $0.4 \times 10^{-3}$ μm$^{-1}$ and $1.7 \times 10^{-3}$ μm$^{-1}$. The inner cladding can also be doped with $SiF_4$, in which case the period remains unchanged and the ratio between the absolute peak-to-peak index difference and the half-period of the variations lies in the range $0.2 \times 10^{-3}$ μm$^{-1}$ and $0.7 \times 10^{-3}$ μm$^{-1}$.

It is also advantageous for the rate of index variation in the cladding to be less than $0.1 \times 10^{-3}$ μm$^{-1}$.

The fiber can also present an effective area greater than or equal to 90 μm$^2$ at the wavelength of 1.55 μm, or a theoretical cutoff wavelength that is less than or equal to 1.65 μm.

In terms of profile, the optical fiber can be characterized by one or more of the following relationships:

the ratio between the radius $r_2$ (in μm) of the deposition tube and the radius $r_1$ (in μm) of the core is greater than or equal to $-7.33 \times r_1 \times \sqrt{\Delta n} + 4.36$, where $r_1 \times \sqrt{\Delta n}$ is the product of multiplying the radius of the core by the square root of the difference between the core index and the inner cladding index;

the ratio between the radius $r_2$ of the deposition tube and the radius $r_1$ of the core is less than or equal to $-10.71 \times r_1 \times \sqrt{\Delta n} + 6.7$, where $r_1 \times \sqrt{\Delta n}$ is the product of the core radius multiplied by the square root of the difference between the core index and the inner cladding index.

It is also advantageous for the power propagating in the portion of the fiber that corresponds to the deposition tube to lie in the range 0.025% to 1.4%.

BRIEF DESCRIPTION OF THE DRAWING

Other characteristics and advantages of the invention will appear on reading the following description of embodiments of the invention given by way of example, and with reference to the accompanying drawing in which the sole FIGURE is a diagram showing the index profile of a fiber of the invention.

MORE DETAILED DESCRIPTION

Figure 1:
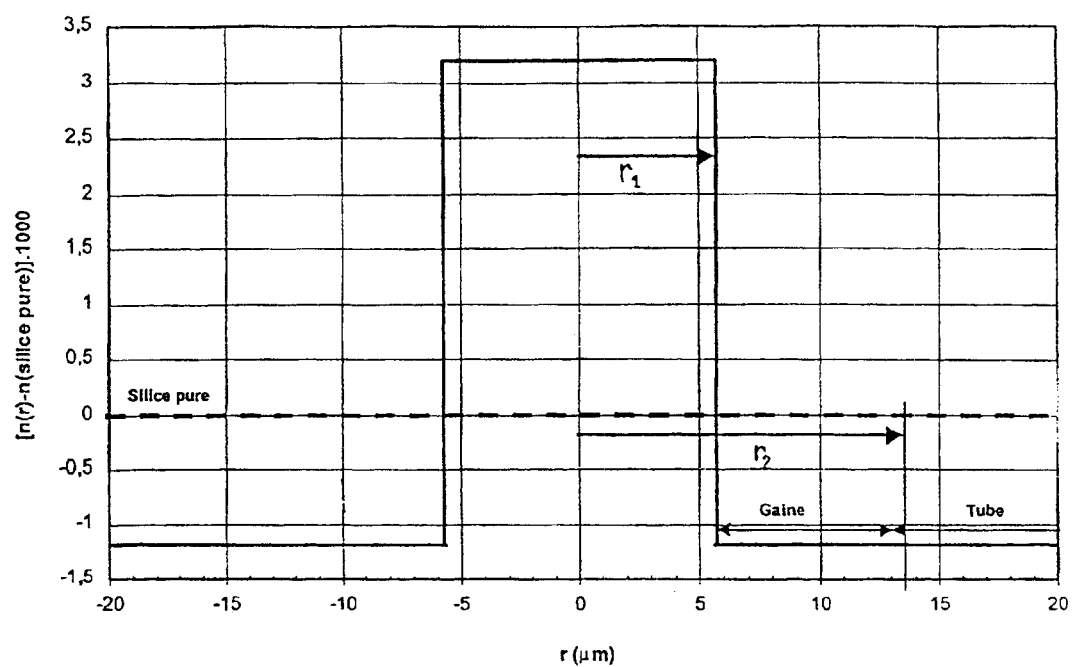

In order to fabricate a step index optical fiber by MCVD, the invention proposes using a deposition tube with an index-lowering dopant; doped inner cladding is deposited inside the tube, which cladding presents substantially the same refractive index as the deposition tube; and then a doped core is deposited presenting a refractive index that is higher than the index of the cladding and of the deposition tube. After collapsing, it is also advantageous to provide build-out material which is also doped to lower its index down to a value close to the index of the deposition tube.

The fiber obtained after drawing such a preform made using this method presents a core, inner cladding which corresponds to the doped inner cladding as deposited inside the deposition tube, and cladding which corresponds to the deposition tube; in the fiber obtained in this way, it is possible to distinguish between the cladding, the inner cladding, and the core of the fiber. The cladding comes from the deposition tube and it presents an index that is substantially constant; in any event, the cladding has no reason to present substantially periodic variations in index that are circularly symmetrical about the axis of the fiber. Similarly, the build-out material or the sleeve of index that does not exceed the index of the cladding by more than $0.5 \times 10^{-3}$ does not present any substantially periodic variation in index either. In contrast, the inner cladding results from chemical vapor deposition (CVD) inside the deposition tube. Insofar as such deposition is performed as a plurality of passes, the inner cladding presents a plurality of interfaces or small-amplitude index ripples. It is therefore possible to determine on a given optical fiber whether or not there exists both cladding and inner cladding.

The level of bending losses is an important characteristic for taking into consideration when making an optical fiber. In a step index fiber, bending losses depend on the index of the cladding and on the ratio $r_2/r_1$ which specifies the ratio of the radius $r_2$ marking the beginning of the cladding as measured from the axis of the fiber to the radius of the core $r_1$. For a given cladding index, bending losses increase with decreasing ratio $r_2/r_1$. Similarly, for given ratio $r_2/r_1$, bending losses increase with cladding index. In order to maintain a low level of bending losses, a level of less than $10^{-5}$ decibels per meter (dB/m) for a bending radius of 30 mm—the radius $r_2$ must remain greater than a minimum value $r_{2m}$ which increases with increasing cladding index. Assuming that the cladding index remains greater than or equal to the index of the inner cladding, the value of $r_{2m}$ is at a minimum when the index of the cladding is equal to the index of the inner cladding. This applies in particular to fibers of the invention where the index of the deposition tube and of the build-out material is substantially equal to the index of the inner cladding. In contrast, this does not apply to pure silica core fibers (PSCF) made using OVD or AVD techniques in which the index of the silica cladding is equal to the index of the core. PSCFs are thus characterized by large values for the radius $r_2$ as defined above and consequently they require a large deposition section for the inner cladding in order to maintain a low level of bending losses. Compared with PSCFs, the solution of the invention has the advantage of presenting a cladding index and a build-out material index that are substantially equal to the index of the inner cladding, thus making it possible to limit to a considerable extent the thickness of the inner cladding, and thereby achieving a comparable reduction in fabrication cost. With fibers of the invention, the role of the inner cladding is mainly that of reducing the contribution of the deposition tube to spectrum attenuation, which contribution is proportional to the power of the optical field propagating in the tube and to the absorbance of the tube at the operating wavelength.

The invention presents another advantage concerning spectrum attenuation. The small proportion of germanium dopant present in the deposited layers of the core limits Rayleigh diffusion in the fiber core, and consequently limits spectrum attenuation. Using $\Delta n_c$ to denote the difference between the index $n_c$ of the core and the index $n_g$ of the cladding, the following equation can be written:

$$\Delta n_c = n_c - n_g = (n_c - n_{si}) + (n_{si} - n_g) \quad (1)$$

where:

$(n_g < n_{si})$; and $n_{si}$ designates the refractive index of silica.

The quantity of germanium to be deposited in the core of a fiber of the invention is proportional to $(n_c - n_{si})$ and not to $(n_c - n_g)$ which shows the advantage of using cladding doped in fluorine whose index is lower than that of silica.

There follows an example of implementing a preform and a fiber of the invention using a modified chemical vapor deposition technique. A deposition tube is used that has been doped to present an index that is lower than that of silica: the doping can be fluorine doping, at a concentration lying in the range 2500 ppm to 3500 ppm by weight, thus having the effect of lowering the index of the tube to values below the index of silica by at least $0.5 \times 10^{-3}$. The deposition tube typically presents an inside diameter of 34 mm, an outside diameter of 39 mm, and a length lying in the range 1300 mm to 1690 mm. It is possible to use the deposition tube sold under the reference F320 HERAEUS.

Inner cladding which is doped to lower its index relative to the index of silica is formed on the inside of the deposition tube. The inner cladding presents an index close to the index of the deposition tube. It is advantageous for the inner cladding to present an index that is equal to that of the deposition tube; an index difference between the inner cladding and the deposition tube is acceptable providing it remains in the range $-0.3 \times 10^{-3}$ and 0. In relative terms, it is advantageous for the relative difference between the index of the inner cladding and the index of the deposition tube to be smaller than 0.02% in absolute value. Such differences have limited incidence on the transmission properties of the resulting optical fiber. In particular, it is possible to use fluorine doping at a concentration of 0.3% to 1% by weight of fluorine in order to lower the index of the cladding. In order to form this inner cladding, conventional chemical vapor deposition techniques are used.

Thereafter, a core is formed inside the deposition tube, which core is doped so as to increase its index compared with the index of silica. Advantageously, the difference between the index of the core and the index of the inner cladding lies in the range $4.3 \times 10^{-3}$ to $5 \times 10^{-3}$. By way of example, these values correspond to index differences lying in the range $3.3 \times 10^{-3}$ to $4 \times 10^{-3}$ relative to the index of silica when the index difference between the inner cladding and the index of silica is $-1 \times 10^{-3}$.

After the inner cladding and the core have been deposited inside the deposition tube, the preform is collapsed so as to close the opening through which gases pass inside the deposition tube. After the deposition tube has been collapsed, a sleeve can be placed around it or build-out material can be placed on it, in conventional manner: a sleeve is collapsed around the preform whereas build-out material is deposited using chemical vapor deposition or plasma deposition. The sleeve has a refractive index that is substantially constant, without any ripple. The built-out material can present ripple, depending where appropriate on the fabrication process, for example variations in dopant. It is advantageous for the index of the sleeve or of the built-out material to be as close as possible to the index of the deposition tube. The sleeve or the build-out material can be doped, e.g. using fluorine. As for the inner cladding, a difference of less than $0.3 \times 10^{-3}$ between the index of the sleeve or of the built-out material and the index of the deposition tube is acceptable.

The dimensions of the preform can be as follows:
outside diameter of the core: 3.5 mm to 4 mm;
inside diameter of the deposition tube: 8 mm to 10 mm;
outside diameter of the deposition tube: 18 mm to 22 mm; and
final diameter of the built-out or sleeved preform: 39 mm to 45 mm.

Such a preform can be drawn using a conventional fiber-drawing method to obtain a fiber presenting the reference index profile shown in FIG. 1. Distance r to the center of the fiber is plotted along the abscissa axis, and difference between refractive index and the refractive index of the cladding of the fiber is plotted up the ordinate axis. The profile shown in FIG. 1 is a step index profile. There can be seen around the axis of the fiber a fiber core which presents an index greater than that of silica; the core radius $r_1$ lies in the range 4.8 μm to 5.7 μm.

Around the core, the fiber presents an index that is substantially constant and that is less than that of silica.

Between the radii $r_1$ and $r_2$ there extends the portion of the fiber which corresponds to the inner cladding; $r_2$ typically lies in the range 12.5 µm to 15.7 µm. This portion of the fiber is referred to below as the "inner cladding". As explained above, it differs from the portion of the fiber which corresponds to the deposition tube because of the presence of ripple in its index. This ripple constitutes quasi-periodic variations in the value of the index along the radius of the index profile, i.e. along a radius of the fiber. Its period depends on the thickness of the layers deposited inside the deposition tube, and on the way dimensions vary when the preform is collapsed and subsequently while it is being drawn. These quasi-periodic variations can depend on the dopants used. $C_2F_6$ can be used as the dopant for inner cladding indices lowered to $-1.5 \times 10^{-3}$ relative to the index of silica. It is common practice to use $SiF_4$ to reach index values of less than $-1.5 \times 10^{-3}$ relative to the index of silica. The relative peak-to-peak size of the index ripple can vary depending on the dopant used. Typical values for variations with $C_2F_6$ as dopant lie in the range $0.3 \times 10^{-3}$ to $0.5 \times 10^{-3}$. Given the quasi-periodic nature of the ripple, the ratio between this peak-to-peak variation and the half-period lies in the range $0.4 \times 10^{-3}$ µm$^{-1}$ and $1.7 \times 10^{-3}$ µm$^{-1}$. Typical values for variations when using $SiF_4$ as the dopant are smaller, being situated typically around $0.2 \times 10^{-3}$, which leads to a ratio for peak-to-peak variations to the half-period lying in the range $0.2 \times 10^{-3}$ µm$^{-1}$ to $0.7 \times 10^{-3}$ µm$^{-1}$. It is also possible for the dopant in the inner cladding to be constituted by germanium at a concentration of 0.3% to 1% by weight and/or phosphorus at a concentration of 0.3% to 0.4% by weight. Where necessary, germanium makes it possible to limit spectrum attenuation, while phosphorus provides for better vitrification of the deposit.

Beyond the radius $r_2$, there extends the portion of the fiber which corresponds to the deposition tube and to the build-out. The portion corresponding to the deposition tube is referred to below as the "cladding". Variations in the index of the cladding are associated with the uniformity of the index in the deposition tube. In the cladding, index generally varies slowly and these variations generally remain smaller than $0.1 \times 10^{-3}$. In contrast, unlike the inner cladding, these variations are not periodic. The rate of vibration, measured radially over a distance of 1 µm, is smaller than $0.1 \times 10^{-3}$ µm$^{-1}$, in other words is smaller than the radial index variations in the inner cladding.

The index difference between the core of the fiber and the inner cladding, i.e. the index step in the fiber, typically lies in the range $4.3 \times 10^{-3}$ to $5 \times 10^{-3}$.

The fiber of the invention presents the following propagation characteristics, as measured at 1550 nm:
  chromatic dispersion: in the range 18.7 ps/(nm.km) to 20.3 ps/(nm.km);
  chromatic dispersion slope: in the range 0.058 ps/(nm$^2$.km) to 0.61 ps/(nm$^2$.km)
  theoretical cutoff wavelength: less than or equal to 1650 nm;
  bending losses for 10 mm: less than or equal to 15 dB/m;
  effective area: greater than or equal to 90 µm$^2$;
  mode diameter: greater than or equal to 10.7 µm; and
  attenuation: less than or equal to 0.22 dB/km.

Bending losses are measured by winding the fiber around a sleeve having a diameter of 10 mm.

By way of example, a fiber having a core radius of 5.7 µm, presenting inner cladding having an outside radius of 13.68 µm, with an index that is $1.2 \times 10^{-3}$ below the index of silica and an index step of $4.4 \times 10^{-3}$ between the inner cladding and the core has the following propagation characteristics at 1550 nm:
  chromatic dispersion: 19.6 ps/(nm.km);
  chromatic dispersion slope: 0.06 ps/(nm$^2$.km);
  theoretical cutoff wavelength: 1645 nm;
  bending losses: 12.3 dB/m;
  effective area: 113 µm$^2$;
  mode diameter: 11.8 µm; and
  attenuation: 0.18 dB/km.

The invention makes it possible to use MCVD to obtain a step index fiber presenting a large effective area and low attenuation. The attenuation values obtained result in particular from the dopant concentration in the fiber core, and this is lower than in state-of-the-art fibers. The method of the invention makes it possible to fabricate at lower cost because of the reduced thickness of the inner cladding that needs to be deposited inside the deposition tube.

The fiber of the invention can be used for any known application of step index fibers, and in particular as a line fiber in an optical fiber transmission system. It generally presents the following propagation characteristics. For a fluorine-doped tube having an index that is less than the index of silica by at least $0.5 \times 10^{-3}$, and for the core having an index value lying in the range $4 \times 10^{-3}$ to $5 \times 10^{-3}$ relative to the tube index, the values of the index step relative to the index of silica remain less than $4.5 \times 10^{-3}$. As explained above, this value is less than the value obtained for a conventional silica-clad step index fiber; this reduction in the index of the core relative to the index of silica in the fiber of the invention corresponds to reducing Rayleigh diffusion in the fiber.

The profiles obtained when the conditions of the preceding paragraph are satisfied comply with the following inequalities:
  $4.3 \times 10^{-3} \leq \Delta n \leq 5 \times 10^{-3}$ where $\Delta n$ is the difference between the core index and the inner cladding index;
  $4.8\ \mu m \leq r_1 \leq 5.7\ \mu m$ where $r_1$ is the radius of the fiber core; and
  $0.336\ \mu m \leq r_1 \times \sqrt{\Delta n} \leq 0.378\ \mu m$.

The third relationship is one possible solution for ensuring that the fibers have an effective area that is greater than or equal to 90 µm$^2$ and less than or equal to 115 µm$^2$, with a theoretical cutoff wavelength of less than 1.65 µm.

It is also possible to determine the extreme positions for the deposition tube as a function of radius and for index; for this purpose, it is possible to use the following relationships:

$$(r_2/r_1)_{min} = -7.33 \times r_1 \times \sqrt{\Delta n} + 4.36$$

and $$(r_2/r_1)_{max} = -10.71 \times r_1 \times \sqrt{\Delta n} + 6.7$$

When the above relationships are satisfied, the power of the mode propagating in the deposition tube lies in the range 0.025% to 1.4% of the total power propagating in the fiber, and the attenuation increment due to absorption by the deposition tube remains less than about 0.01 dB/km.

In the above description, the details of implementing modified chemical vapor deposition are not described since they are well known to the person skilled in the art. The invention is described in the context of MCVD. It could also be implemented using plasma-assisted chemical vapor deposition (PCVD), or any other technique for depositing inside a deposition tube. The invention also makes it possible to obtain a fiber presenting a different profile.

What is claimed is:

1. A method of fabricating a preform for drawing into an optical fiber, the method comprising:
  using chemical vapor deposition to form inner cladding inside a deposition tube, the deposition tube presenting a refractive index lower than that of silica and the inner cladding presenting an index substantially equal to the index of the deposition tube, the relative difference between the index of the inner cladding and the index of the deposition tube having an absolute value smaller than 0.02%; and using chemical vapor deposition to form a core inside the cladding, the core presenting an index higher than the index of silica.

2. The method of claim 1, wherein the difference between the index of the deposition tube and the index of silica is less than $-0.5 \times 10^{-3}$.

3. The method of claim 1, wherein the difference between the index of the core and the index of the inner cladding lies in the range $4.3 \times 10^{-3}$ and $5 \times 10^{-3}$.

4. The method of claim 1, further comprising:

collapsing the deposition tube with the inner cladding and the core; and depositing build-out material around the collapsed tube, the build-out material presenting an index substantially equal to the index of the deposition tube.

5. The method of claim 1, further comprising:

collapsing the deposition tube with the inner cladding and the core; and collapsing a sleeve around the collapsed tube, the sleeve presenting an index substantially equal to the index of the deposition tube.

6. A preform for drawing an optical fiber, the preform comprising:

a deposition tube presenting an index less than the index of silica;

cladding inside the deposition tube presenting an index substantially equal to the index of the deposition tube, the relative difference between the index of the inner cladding and the index of the deposition tube having an absolute value smaller than 0.02%; and a core inside the cladding presenting an index higher than the index of silica.

7. The preform of claim 6, wherein the difference between the index of the deposition tube and the index of silica is less than $-0.5 \times 10^{-3}$.

8. The preform of claim 6, wherein the difference between the index of the core and the index of the inner cladding lies in the range $4.3 \times 10^{-3}$ and $5 \times 10^{-3}$.

9. The preform of claim 6, having build-out material around the deposition tube, the build-out material having an index substantially equal to the index to the index of the deposition tube.

10. The preform of claim 6, having a sleeve around the deposition tube, the sleeve presenting an index substantially equal to the index of the deposition tube.

11. A method of fabricating an optical fiber, comprising drawing a preform according to claim 6.

12. An optical fiber presenting:

cladding having an index less than the index of silica;

inner cladding extending inside said cladding and presenting an index substantially equal to the index of the cladding, the relative index difference between the index of the inner cladding and the index of the cladding having an absolute value of less than 0.02%; and a core extending inside the inner cladding and presenting an index greater than the index of silica.

13. An optical fiber according to claim 12, presenting:

a difference $\Delta n$ between the index of the core and the index of the inner cladding lying in the range $4.3 \times 10^{-3}$ and $5 \times 10^{-3}$;

a core radius $r_1$ lying in the range 4.8 $\mu$m to 5.7 $\mu$m; and a product $r_1 \times \sqrt{\Delta n}$ of the core radius multiplied by the square root of said difference lying in the range 0.336 $\mu$m to 0.378 $\mu$m.

14. The optical fiber of claim 12, presenting cladding in which the index difference relative to the index of silica is less than $-0.5 \times 10^{-3}$.

15. The optical fiber of claim 12, wherein the inner cladding presents quasi-periodic variations in index that are symmetrical about the axis of the fiber.

16. The optical fiber of claim 15, wherein the inner cladding is doped using $C_2F_6$, and wherein the ratio between the absolute peak-to-peak difference in the index and the half-period of the variants lies in the range $0.4 \times 10^{-3} \mu m^{-1}$ to $1.7 \times 10^{-3} \mu m^{-1}$.

17. The optical fiber of claim 15, wherein the inner cladding is doped using $SiF_4$, and wherein the ratio between the peak-to-peak index difference and the half-period of the variants lies in the range $0.2 \times 10^{-3} \mu m^{-1}$ to $0.7 \times 10^{-3} \mu m^{-1}$.

18. The optical fiber of claim 12, wherein the rate of index variation in the cladding as measured radially over a distance of 1 $\mu$m is less than $0.1 \times 10^{-3}$.

19. The optical fiber of claim 12, presenting an effective area greater than or equal to 90 $\mu m^2$ the wavelength of 1.55 $\mu$m.

20. The optical fiber of claim 12, presenting a theoretical cutoff wavelength that is less than or equal to 1.65 $\mu$m.

21. The optical fiber of claim 12, wherein the ratio between the radius $r_2$ of the deposition tube and the radius $r_1$ of the core is greater than or equal to:

$$-7.33 \times r_1 \times \sqrt{\Delta n} + 4.36$$

where $r_1 \times \sqrt{\Delta n}$ is the product of the core radius multiplied by the square root of the difference between the core index and the inner cladding index.

22. The optical fiber of claim 12, wherein the ratio between the radius $r_2$ of the deposition tube and the radius $r_1$ of the core is less than or equal to:

$$-10.71 \times r_1 \times \sqrt{\Delta n} + 6.7$$

where $r_1 \times \sqrt{\Delta n}$ is the product of the core radius multiplied by the square root of the difference between the core index and the inner cladding index.

23. The optical fiber of claim 12, wherein the power of the mode propagating in the portion of the fiber corresponding to the deposition tube lies in the range 0.025% to 1.4%.

24. A method of fabricating a preform for drawing into an optical fiber, the method comprising:

forming an inner cladding inside a deposition tube, the deposition tube presenting a refractive index lower than that of silica and the inner cladding presenting an index substantially equal to the index of the deposition tube, the relative difference between the index of the inner cladding and the index of the deposition tube having an absolute value no greater than 0.02%; and forming a core inside the cladding, the core presenting an index higher than the index of silica.

25. The method of claim 24, wherein the difference between the index of the deposition tube and the index of silica is no greater than $-0.5 \times 10^{-3}$.

26. A preform for drawing an optical fiber, the preform comprising:

a deposition tube presenting an index less than the index of silica;

cladding inside the deposition tube presenting an index substantially equal to the index of the deposition tube, the relative difference between the index of the inner cladding and the index of the deposition tube having an absolute value no greater than 0.02%; and a core inside the cladding presenting an index higher than the index of silica.

27. The preform of claim 26, wherein the difference between the index of the deposition tube and the index of silica is no greater than $-0.5 \times 10^{-3}$.

* * * * *